United States Patent
Tsujii et al.

(10) Patent No.: US 12,451,697 B2
(45) Date of Patent: Oct. 21, 2025

(54) POWER SUPPLY-DEMAND ADJUSTMENT DEVICE AND METHOD

(71) Applicant: Hitachi, Ltd., Tokyo (JP)

(72) Inventors: Yuki Tsujii, Tokyo (JP); Eisuke Kuroda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 166 days.

(21) Appl. No.: 18/271,052

(22) PCT Filed: Dec. 16, 2021

(86) PCT No.: PCT/JP2021/046493
§ 371 (c)(1),
(2) Date: Jul. 6, 2023

(87) PCT Pub. No.: WO2022/181003
PCT Pub. Date: Sep. 1, 2022

(65) Prior Publication Data
US 2024/0305100 A1    Sep. 12, 2024

(30) Foreign Application Priority Data
Feb. 24, 2021   (JP) ................. 2021-027779

(51) Int. Cl.
  *H02J 3/46* (2006.01)
  *G06Q 50/06* (2024.01)
  *H02J 3/24* (2006.01)

(52) U.S. Cl.
  CPC ............ *H02J 3/241* (2020.01); *G06Q 50/06* (2013.01); *H02J 3/46* (2013.01)

(58) Field of Classification Search
  CPC .... H02J 3/46; G06Q 50/06 USPC ... 307/24
  See application file for complete search history.

(56) References Cited

U.S. PATENT DOCUMENTS

| | | | | |
|---|---|---|---|---|
| 2015/0025696 A1* | 1/2015 | Hug | ...... | G06Q 50/06 700/286 |
| 2020/0174511 A1* | 6/2020 | Takeuchi | ...... | G06Q 50/06 |

FOREIGN PATENT DOCUMENTS

JP    2013-162563 A    8/2013

OTHER PUBLICATIONS

International Search Report dated Feb. 8, 2022 for PCT International Application No. PCT/JP2021/046493.

* cited by examiner

*Primary Examiner* — Daniel Kessie
*Assistant Examiner* — Dru M Parries
(74) *Attorney, Agent, or Firm* — Volpe Koenig

(57) ABSTRACT

A power supply-demand adjustment device performs output distribution to M adjustment power supplies among N adjustment power supplies in a system, based on adjustment information and supply-demand imbalance. The adjustment information includes output change rate, a distributed output, and an output limit value for each adjustment power supply. For each period, the output distribution satisfying the following (x) and (y) is performed; where (x) is the distribution of an output to the adjustment power supply in an increasing direction in ascending or descending order of the adjustment cost; and (y) is regardless of whether an output direction is the increasing or decreasing direction, an output to be distributed to the adjustment power supply in the period is in a reducing direction with respect to reduction in a difference between the distributed output to the adjustment power supply and the output limit value of the adjustment power supply.

9 Claims, 14 Drawing Sheets

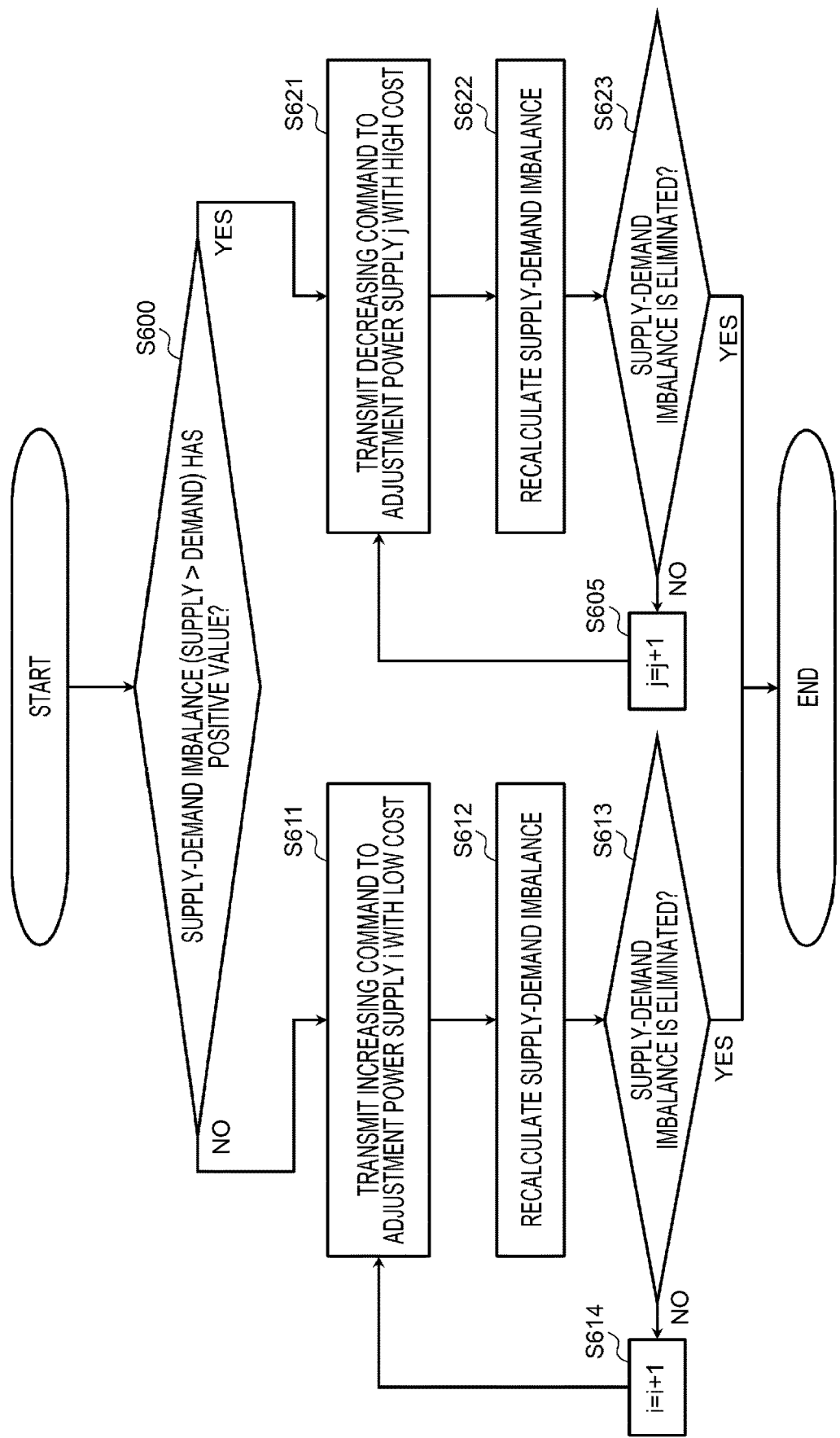

FIG. 7A

COMPARATIVE EXAMPLE

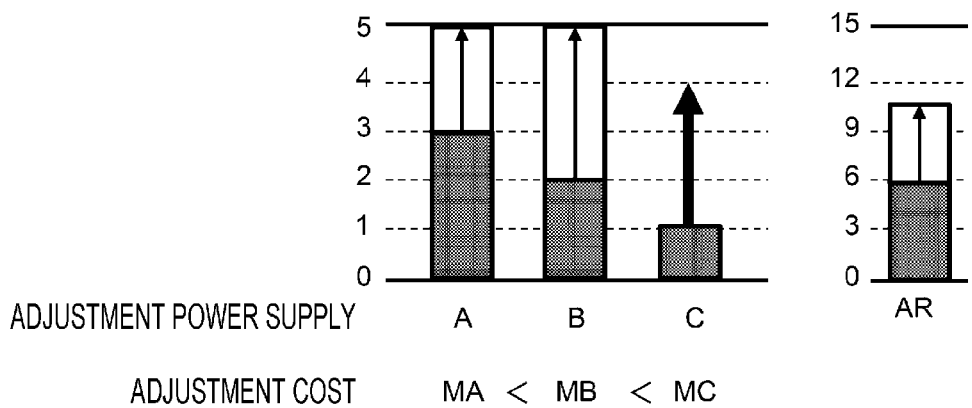

ADJUSTMENT COST   MA < MB < MC

- ▓ OUTPUT DISTRIBUTION COMMAND VALUE IN PERIOD (T-1)
- ⬆ OUTPUT DISTRIBUTION COMMAND VALUE IN PERIOD T
- ⬆ INCREASING OUTPUT DISTRIBUTION POWER AFTER PERIOD T

FIG. 7B

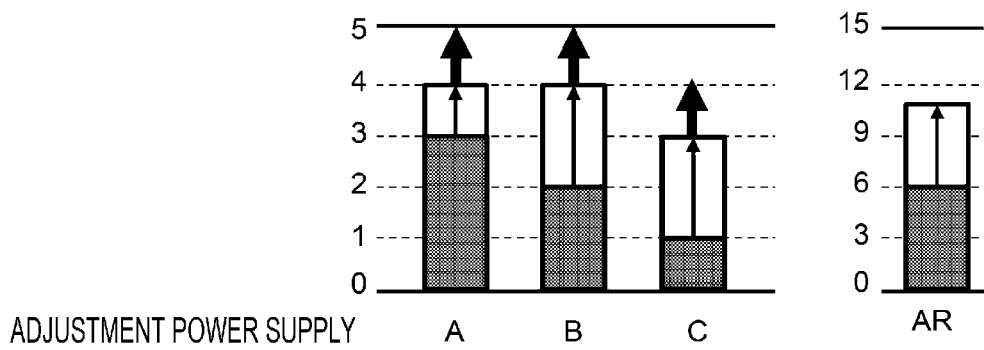

ADJUSTMENT COST   MA < MB < MC

- ▓ OUTPUT DISTRIBUTION COMMAND VALUE IN PERIOD (T-1)
- ⬆ OUTPUT DISTRIBUTION COMMAND VALUE IN PERIOD T
- ⬆ INCREASING OUTPUT DISTRIBUTION POWER AFTER PERIOD T

COMPARATIVE EXAMPLE

POWER SUPPLY-DEMAND ADJUSTMENT DEVICE AND METHOD

TECHNICAL FIELD

The present invention relates generally to a supply-demand adjustment of power.

BACKGROUND ART

In order to stably supply power, it is necessary to adjust the supply-demand balance to maintain a frequency within an allowable range. A system operator (typically, a general power transmission and distribution company) combines a plurality of types of adjustments (for example, output adjustment of the adjustment power supply by Governor Free (GF), Load Frequency Control (LFC), and Economic Load Dispatch (ELD)) in accordance with a variation period of the supply and demand, and maintains a frequency within an allowable range, for example, in units of areas. Note that, in the present specification, the distribution destination of an output of a distribution target in the supply-demand adjustment is referred to as an "adjustment power supply". The "adjustment power supply" may be, for example, at least one of a generator, a storage battery, and a demand response.

Currently, for the purpose of adjusting the supply-demand balance, a system operator can procure adjustment power through public recruitment. In addition, when a supply-demand adjustment market for performing adjustment power transactions is created, the system operator can procure adjustment power (reserve power) in the supply-demand adjustment market.

In the supply-demand adjustment market, in order to cope with demand prediction errors, variations within time, power loss, and the like, each general power transmission and distribution company that may be the system operator secures adjustment power that can be utilized for the above-described plurality of types of adjustment (for example, GF, LFC, and ELD). As the adjustment power handled in the same market, a plurality of types of adjustment power prepared based on viewpoints such as an output change rate and an output duration time are adopted. For example, in Japan, the plurality of types of adjustment power include primary adjustment power, secondary adjustment power (1), secondary adjustment power (2), tertiary adjustment power (1), and tertiary adjustment power (2). According to GF (corresponding to load variation of about several seconds to several minutes) corresponding to the primary adjustment power, the output is increased or decreased in accordance with the change in the system frequency by a speed governor (governor). According to LFC (corresponding to load variation of about several minutes to several tens of minutes) corresponding to the secondary adjustment power (1), frequency fluctuation, interconnection line power flow variation, and the like caused by the load variation are detected, and the output of the adjustment power supply is adjusted. According to ELD (corresponding to load variation of about several tens of minutes or more) corresponding to the secondary adjustment power (2) or the tertiary adjustment power (1), the output is distributed to the adjustment power supply so as to be the most economical (for example, the power generation cost of the entirety of the system is the minimum). Note that the tertiary adjustment power (2) is positioned as adjustment power of the low-speed frame.

These types of adjustment power are required to have "reaction power such as an output change rate in accordance with a command from the central feed command station" and an "adjustment width for coping with the generated supply and demand difference", in addition to the supply capability. In the supply-demand adjustment, in a state where the system operator procures adjustment power (ΔkW) having the "reaction power" and the "adjustment width" in advance, the adjustment power is operated in an actual operation. With the operation of the adjustment power, the adjustment cost borne by the system operator is generated for each adjustment power supply. The adjustment cost includes, for example, cost for procurement of the adjustment power (aspect of securing ΔkW) and a cost for operation of the procured adjustment power (aspect of paying a kWh value to the actually operated adjustment power). Holding the adjustment power (ΔkW) means securing, in advance, an adjustment power supply or the like having necessary adjustment capability for each time section at the time of actual supply and demand in a state where the output can be adjusted.

As a method for adjusting the supply and demand of a power system, for example, there is a technique disclosed in PTL 1. PTL 1 discloses a method capable of increasing a frequency adjustment capacity of a generator (adjustment power supply) by reducing an output (adjustment power) of the generator (adjustment power supply).

CITATION LIST

Patent Literature

PTL 1: JP 2013-162563 A

SUMMARY OF INVENTION

Technical Problem

For example, the system operator procures the adjustment power for a certain period (for example, one week), and distributes the output as a part of the adjustment power to the adjustment power supply based on the priority order based on the adjustment cost. That is, the system operator may adopt the output distribution in accordance with the advantage order. According to the output distribution in accordance with the advantage order, the output is distributed in the ascending order of cost on the increasing side of the adjustment power, and the output is distributed in the descending order of cost on the decreasing side of the adjustment power.

FIG. 1 illustrates an example of the output distribution in accordance with the advantage order.

In this example, it is assumed that the adjustment costs MA to ME of the adjustment power supplies A to E are MA<MB<MC<MD<ME (MA is the lowest). In addition, in this example, it is assumed that an increasing command is issued to the adjustment power supply. In addition, in this example, it is assumed that the output upper limit value is the same "30". It is assumed that the output upper limit values of the adjustment power supplies A to E are all "30", and the adjustment power "80" is distributed to the adjustment power supplies A to E.

First, in the adjustment power "80", "30" corresponding to the output upper limit value of the adjustment power supply A with the lowest adjustment cost is distributed to the adjustment power supply A. Then, in the remaining adjustment powers "50", "30" corresponding to the output upper limit value of the adjustment power supply B with the second lowest adjustment cost is distributed to the adjustment power supply B. Finally, the remaining adjustment power "20" is distributed to the adjustment power supply C with the third lowest adjustment cost.

As described above, in the output distribution in accordance with the advantage order, there are a case where the output to be distributed to the adjustment power supply of the cheap adjustment cost is the output corresponding to the output upper limit value of the adjustment power supply, and a case where the output to be distributed to the adjustment power supply of the expensive adjustment cost is the output corresponding to the output lower limit value of the adjustment power supply. Therefore, the number of adjustment power supplies that can change the output only in one direction increases, and thus the overall output change rate (the maximum value of the output distributable width for a predetermined time) is reduced. When the output change rate is reduced and the supply cannot follow the demand, frequency fluctuation occurs due to an occurrence of supply-demand imbalance.

In the technique disclosed in PTL 1 described above, an output distribution command value of another adjustment power supply (for example, the ELD-equivalent secondary adjustment power (2) or tertiary adjustment power (1)) is just determined in order to secure a certain adjustment power supply (for example, the LFC-equivalent secondary adjustment power (1)). PTL 1 neither discloses nor suggests the above-described problem regarding the output distribution in accordance with the advantage order nor means for solving the problem. The same applies not only to the distribution of the output (adjustment power) in the increasing direction but also to the output (adjustment power) in the decreasing direction.

The present invention has been made in view of the above problems, and an object of the present invention is to achieve both reduction in adjustment cost and maintenance of an output change rate while suppressing frequency fluctuation due to the supply-demand imbalance.

Solution to Problem

A power supply-demand adjustment device performs output distribution in accordance with an advantage order of adjustment cost of M adjustment power supplies (M is a natural number of N or less), to the M adjustment power supplies among N adjustment power supplies (N is a natural number of 2 or more) in a power system, based on adjustment management information and supply-demand imbalance. The adjustment management information indicates an output change rate, a distributed output, and an output limit value for each of the N adjustment power supplies. For each period, the output distribution in accordance with the advantage order is a distribution satisfying the following (x) and (y).

(x) Distribution of an output to the adjustment power supply in an increasing direction in ascending order of the adjustment cost, or distribution of the output to the adjustment power supply in a decreasing direction in descending order of the adjustment cost.

(y) That, regardless of whether an output direction is the increasing direction or the decreasing direction, an output to be distributed to the adjustment power supply in the period is in a reducing direction with respect to reduction in a difference between the distributed output to the adjustment power supply and the output limit value of the adjustment power supply.

Advantageous Effects of Invention

According to the present invention, it is possible to expect achievement of both reduction in adjustment cost and maintenance of an output change rate while suppressing frequency fluctuation due to the supply-demand imbalance.

BRIEF DESCRIPTION OF DRAWINGS

FIG. 6 is a flowchart illustrating an output distribution process according to the first embodiment.

FIG. 7A is a diagram illustrating an example of output distribution according to a comparative example.

FIG. 7B is a diagram illustrating an example of output distribution according to the first embodiment.

DESCRIPTION OF EMBODIMENTS

Figure 1:
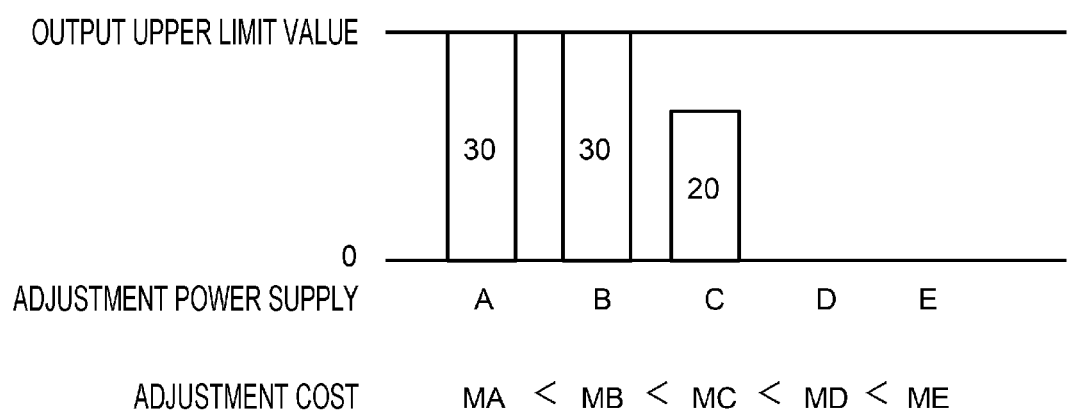
FIG. 1 is a diagram illustrating an example of output distribution in accordance with an advantage order.

In the following description, an "interface device" may be one or more interface devices. The one or more interface devices may be at least one of the following.

One or more I/O (Input/Output) interface devices. The I/O (Input/Output) interface device is an interface device for at least one of an I/O device and a remote display computer. The I/O interface device for the display computer may be a communication interface device. The at least one I/O device may be any of a user interface device, for example, an input device such as a keyboard and a pointing device, and an output device such as a display device.

One or more communication interface devices. The one or more communication interface devices may be one or more communication interface devices of the same type (for example, one or more network interface cards (NICs)) or two or more communication interface devices of different types (for example, an NIC and a host bus adapter (HBA)).

Further, in the following description, a "memory" is one or more memory devices, and may typically be a main storage device. The at least one memory device in the memory may be a volatile memory device or a non-volatile memory device.

Further, in the following description, a "persistent storage device" is one or more persistent storage devices. The persistent storage device is typically a non-volatile storage device (for example, an auxiliary storage device), and is specifically, for example, a hard disk drive (HDD) or a solid state drive (SSD).

In addition, in the following description, a "storage device" may be at least a memory of the memory and the persistent storage device.

In the following description, a "processor" is one or more processor devices. The at least one processor device is typically a microprocessor device such as a central processing unit (CPU), but may be another type of processor device such as a graphics processing unit (GPU). The at least one processor device may be a single core or a multi-core. The at least one processor device may be a processor core. The at least one processor device may be a processor device in a broad sense such as a hardware circuit (for example, a field-programmable gate array (FPGA) or an application specific integrated circuit (ASIC) that performs a part or the entirety of processing.

In addition, in the following description, information from which an output is obtained in response to an input may be described with an expression such as "xxx DB" ("DB" is an abbreviation of a database). The information may be data of any structure (for example, may be structured data or unstructured data), or may be a learning model represented by a neural network, a genetic algorithm, or a random forest that generates an output in response to an input. Therefore, "xxx DB" can be referred to as "xxx information". In the following description, one DB may be divided into two or more tables, or all or some of two or more DBs may be one DB.

In addition, in the following description, a function may be described with an expression "yyy unit". The function may be realized by a processor executing one or more computer programs, may be realized by one or more hardware circuits (for example, FPGA or ASIC), or may be realized by a combination thereof. In a case where the function is realized by the processor executing the program, the determined processing is appropriately performed by using the storage device and/or the interface device, and thus, the function may be at least a part of the processor. The processing described with the function as the subject may be processing performed by a processor or a device including the processor. The program may be installed from a program source. The program source may be, for example, a program distribution computer or a computer-readable recording medium (for example, a non-transitory recording medium). The description of each function is an example, and a plurality of functions may be integrated into one function or one function may be divided into a plurality of functions.

In the following description, a "power supply-demand adjustment device" may be a computer system including one or more computers, or may be a device (for example, a device for a cloud computing service or a virtual device (for example, a virtual computer or a container) implemented on a computer system) implemented in the computer system (for example, a cloud infrastructure).

In addition, in the following description, in a case where the same type of elements are described without being distinguished, common reference signs among the reference signs may be used. In a case where the same type of elements are described while being distinguished, the reference signs may be used.

Hereinafter, embodiments of the present invention will be described with reference to the accompanying drawings. Note that, the embodiments described below do not limit the invention according to the claims, and all the elements and combinations described in the embodiments are not necessarily essential for the solution of the invention.

Note that, in the drawings for describing the embodiments, portions having the same functions are denoted by the same reference signs, and repeated description thereof will be omitted.

In the following description of the first to third embodiments, the power supply-demand adjustment can be applied to any type of adjustment among a plurality of types of adjustment (for example, GF, LFC, and ELD) corresponding to a plurality of variation period levels. The power supply-demand adjustment device may perform one type or a plurality of types of adjustment. The "variation period level" means a level of a length of a variation period. For example, when the variation period is about several tens of minutes, the level of the variation period may be large (long period). When the variation period is about several minutes, the level of the variation period may be medium (short period). When the variation period is about several 10 seconds, the level of the variation period may be small (fine variation period). For example, ELD may correspond to a long period, LFC may correspond to a short period, and GF may correspond to a fine variation period.

First Embodiment

Figure 2:
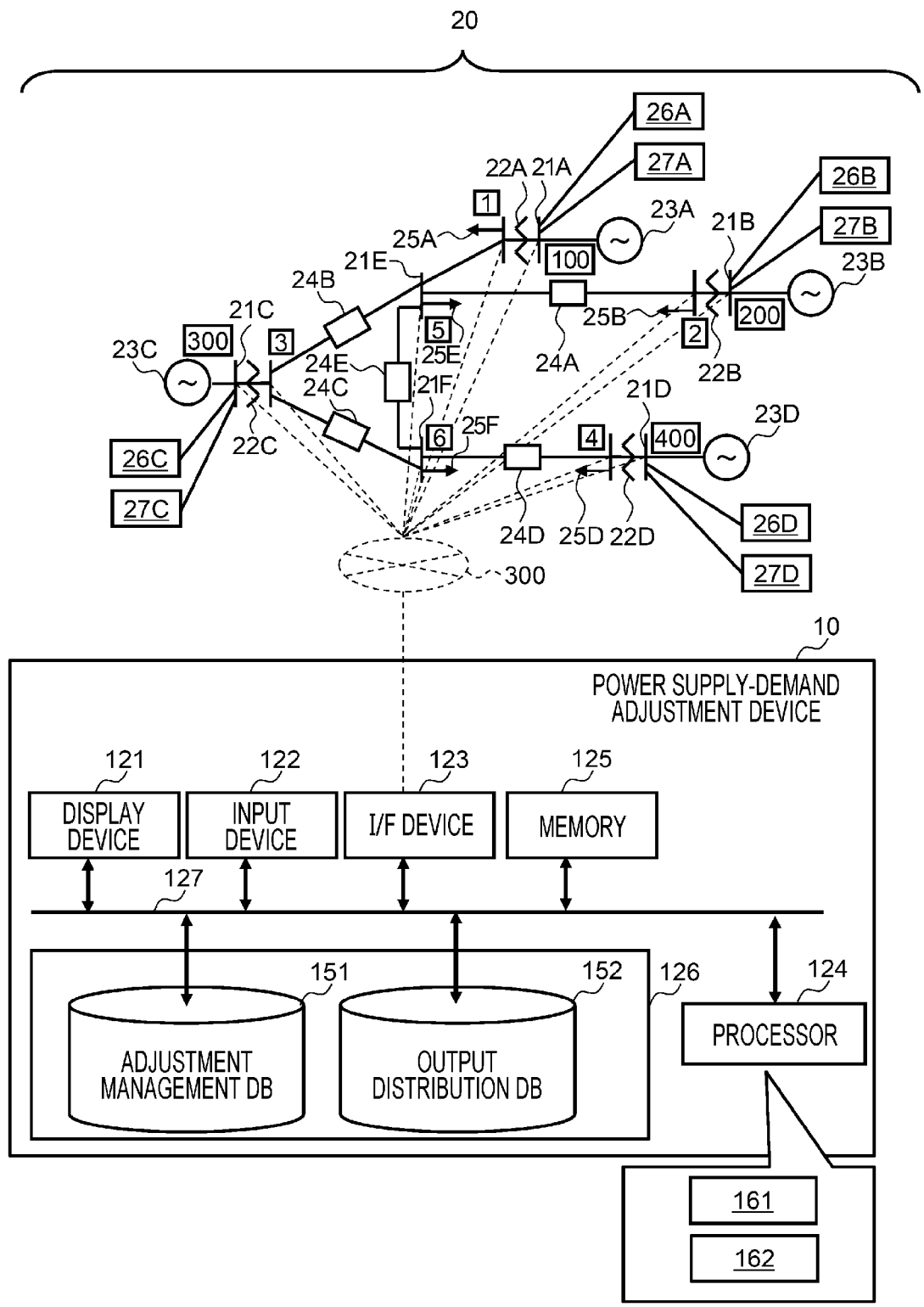
FIG. 2 is a block diagram illustrating a hardware configuration of a power supply-demand adjustment device according to a first embodiment.

FIG. 2 is a block diagram illustrating a hardware configuration of a power supply-demand adjustment device according to a first embodiment.

In FIG. 2, a power supply-demand adjustment device 10 is configured by, for example, a computer system. The power supply-demand adjustment device 10 performs supply-demand adjustment to suppress frequency fluctuation caused by load variation or the like of a power system 20. At this time, the power supply-demand adjustment device 10 calculates supply-demand imbalance, and instructs an output distribution command, which is a command designating an output distribution value (output value to be distributed) following the supply-demand imbalance, to an adjustment power supply (for example, generator 23, storage battery 26, or renewable energy generator 27), so that it is possible to maintain (suppress) the system frequency within an allowable range.

The power supply-demand adjustment device 10 can access measurement information and the like of the power system 20 via a communication network 300. The power system 20 is, for example, a system in which a plurality of generators 23A to 23D and a plurality of loads 25A, 25B, 25D to 25F are interconnected via buses (nodes) 21A to 21F, transformers 22A to 22D, transmission lines (branches) 24A to 24E, and the like. Each of the generators 23A to 23D referred to herein may be, for example, a thermal power generator, a hydraulic power generator, or a nuclear power generator. In the nodes 21A to 21F, various measuring instruments for protecting, controlling, and monitoring the power system 20 are installed. Further, storage batteries 26A to 26D and renewable energy generators 27A to 27D are connected to the nodes 21A to 21D, respectively. Each of the renewable energy generators 27A to 27D may be, for example, a solar power generator, a solar heat generator, or a wind power generator. The generators 23A to 23D, the storage batteries 26A to 26D, and the renewable energy generators 27A to 27D are examples of N adjustment power supplies (N is a natural number of 2 or more) in the power system 20.

The power supply-demand adjustment device 10 includes a display device 121, an input device 122, an I/F (interface) device 123, a memory 125, a persistent storage device 126, and a processor 124 connected thereto. The display device 121, the input device 122, the I/F device 123, the processor 124, the memory 125, and the persistent storage device 126 are connected via a bus 127, for example.

The display device 121 displays parameters handled by the power supply-demand adjustment device 10, processing results in the power supply-demand adjustment device 10, and the like. The display device 121 may be a liquid crystal display device. Furthermore, the display device 121 is an example of an output device, and the output device may include at least one of a printer and an audio output device instead of or in addition to the display device 121.

The input device 122 inputs various conditions and the like for operating the power supply-demand adjustment device 10. The input device 122 can use a keyboard, a mouse, and the like, and may include at least one of a touch panel, a voice instruction device, and the like.

The I/F device 123 includes a circuit and a communication protocol for connection to the communication network 300. The communication network 300 may be a WAN (Wide Area Network) such as the Internet, may be a LAN (Local Area Network) such as WiFi or Ethernet (registered trademark), or may be a mixture of the WAN and the LAN.

The processor 124 may execute a computer program to perform processing related to search of data in various databases (DBs) stored in the persistent storage device 126, an instruction to display processing results, load frequency control of the power system 20, and the like. The processor 124 may be configured as one or a plurality of semiconductor chips, or may be configured as a computer device such as a computing server. The execution of the program may be shared by a plurality of processors or computers. Alternatively, the processor 124 may instruct a cloud computer or the like to execute the entirety or a part of a load frequency control program via the communication network 300 and receive the execution result.

The memory 125 is configured as, for example, a random access memory (RAM), stores a computer program and calculation result data, and provides the processor 124 with a work area necessary for each type of processing.

The persistent storage device 126 can store execution files of various programs and data used for executing the programs. The persistent storage device 126 can store an adjustment management DB 151 and an output distribution DB 152. In addition, the persistent storage device 126 can store a supply-demand adjustment program. The supply-demand adjustment program may be software that can be installed in the power supply-demand adjustment device 10, or may be incorporated as firmware in the power supply-demand adjustment device 10. An imbalance specifying unit 161 and an output distribution unit 162 are realized by the processor 124 executing the supply-demand adjustment program.

The adjustment management DB 151 represents an output change rate, a distributed output, and an output limit value for each adjustment power supply in the power system 20. For each adjustment power supply, at least one of an output upper limit value and an output lower limit value is provided as the "output limit value". The adjustment management DB 151 may further include information (for example, information indicating the procured adjustment power and the remaining adjustment power obtained by subtracting a distribution target output from the adjustment power) indicating the procured adjustment power. Furthermore, the adjustment management DB 151 may include information indicating adjustment cost for each adjustment power supply.

The output distribution DB 152 stores an output distribution command value to each adjustment power supply to which the output is distributed in the power system 20. Regarding the adjustment power supply, the "output distribution command value" is a value (output distribution value) indicating the distributed output, and is a value designated in the output distribution command to the adjustment power supply. The "output distribution command" is a command to increase or decrease the output in the distributed output range.

Note that, although FIG. 2 illustrates an example in which the power supply-demand adjustment device 10 stores the adjustment management DB 151 and the output distribution DB 152, at least one of the adjustment management DB 151 and the output distribution DB 152 may be stored in a storage device (for example, a cloud server) outside the power supply-demand adjustment device 10.

Figure 3:
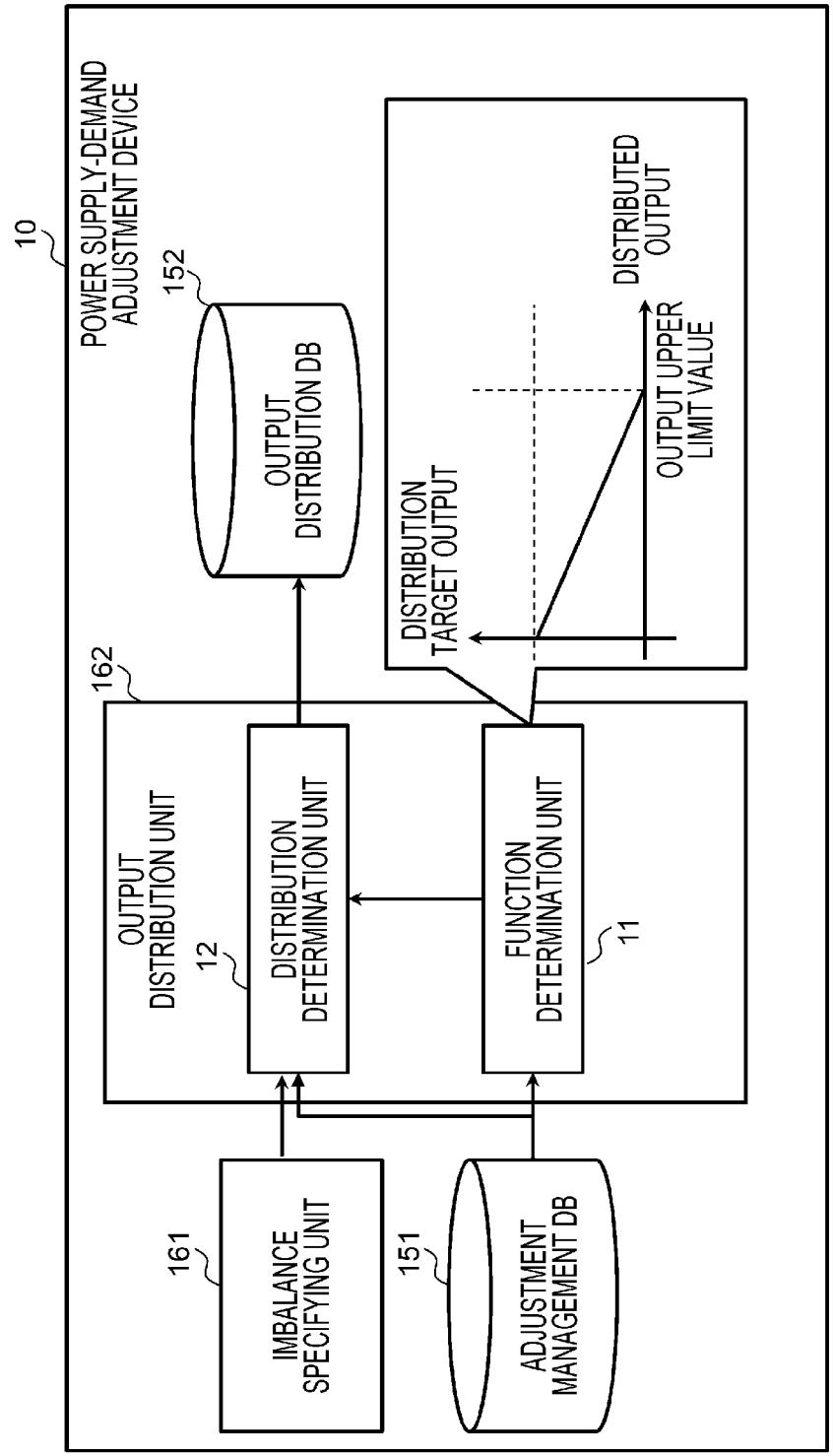
FIG. 3 is a block diagram illustrating a functional configuration of the power supply-demand adjustment device according to the first embodiment.

FIG. 3 is a block diagram illustrating a functional configuration of the power supply-demand adjustment device 10.

In FIG. 3, the power supply-demand adjustment device 10 includes the imbalance specifying unit 161, the output distribution unit 162, the adjustment management DB 151, and the output distribution DB 152 as described above.

The imbalance specifying unit 161 specifies the supply-demand imbalance of the power system 20 by a method such as accessing measurement information of the power system 20.

The output distribution unit 162 performs output distribution in accordance with an advantage order of adjustment cost of M adjustment power supplies (M is a natural number of N or less), to the M adjustment power supplies among N adjustment power supplies in the power system 20, based on the adjustment management DB 151 and the specified supply-demand imbalance. The value of the output distributed to the adjustment power supply by the output distribution is recorded in the output distribution DB 152 by the output distribution unit 162.

In the first embodiment, for each period, the output distribution in accordance with the advantage order is a distribution satisfying the following (x) and (y).

(x) Distribution of an output to the adjustment power supply in an increasing direction in ascending order of the adjustment cost, or distribution of the output to the adjustment power supply in a decreasing direction in descending order of the adjustment cost.

(y) That, regardless of whether an output direction is the increasing direction or the decreasing direction, an output to be distributed to the adjustment power supply in the period is in a reducing direction with respect to reduction in a difference between the distributed output to the adjustment power supply and the output limit value of the adjustment power supply.

As a result, it is possible to expect achievement of both reduction in adjustment cost and maintenance of an output change rate while suppressing frequency fluctuation due to the supply-demand imbalance. Specifically, it is possible to expect both the followings.

To suppress an increase in adjustment cost for output distribution in accordance with an advantage order of the adjustment cost.

When a difference between the distributed output to the adjustment power supply and the output limit value of the adjustment power supply is reduced (that is, when the distributed output increases in an increasing direction or a decreasing direction) regardless of whether the output direction is the increasing direction or the decreasing direction, the output newly distributed to the adjustment power supply reduces, so that it is possible to expect a delay of time (or avoidance of an occurrence) when the total amount of the output distributed to the adjustment power supply reaches the output limit value of the adjustment power supply, and accordingly, the increase of the adjustment power supply in which the output cannot be changed is delayed (or avoided).

Note that the phrase of "distributing an output to the adjustment power supply" may include determining an output to be distributed to the adjustment power supply and transmitting an output distribution command designating a value of the output to the adjustment power supply. Further, the sentence that "the difference between the distributed output to the adjustment power supply and the output limit value of the adjustment power supply is reduced" may mean that the difference between the distributed increasing-direction output to the adjustment power supply and the output upper limit value of the adjustment power supply is reduced, or that the difference between the distributed decreasing-direction output to the adjustment power supply and the output lower limit value of the adjustment power supply is reduced. In addition, the sentence that "the output distributed to the adjustment power supply in the period is reduced with respect to the reduction in the difference between the distributed output to the adjustment power supply and the output limit value of the adjustment power supply" may mean that the output distributed to the adjustment power supply in the period is necessarily reduced when the difference is reduced, or may mean that the output distributed to the adjustment power supply in the period is reduced when the difference is reduced (in the latter case, as in the example illustrated in FIG. 4, there may be a range in which the output distributed to the adjustment power supply in the period is not reduced (for example, is constant) even if the difference is reduced).

The output distribution unit 162 includes a function determination unit 11 and a distribution determination unit 12.

The function determination unit 11 determines a distribution control function based on the adjustment management DB 151. The distribution control function is, for example, a function in which the distributed output is set to a first axis and the distribution target output is set to a second axis (axis perpendicular to the first axis) (the distribution control function illustrated in FIG. 3 is a function for an increasing command). The output distribution is performed for each period. In each period, the "distributed output" is an output already distributed in the period (the total amount of outputs distributed in a period before the period), and the "distribution target output" is an output distributed in the period. The distribution control function is a function that reduces the distribution target output (output distributable width) on an increasing side when the distributed output of the adjustment power supply is near the output upper limit value, and reduces the distribution target output (output distributable width) on a decreasing side when the distributed output of the adjustment power supply is near the output lower limit value. Note that the distribution control function may be prepared for each adjustment power supply, or may be common to two or more adjustment power supplies. The distribution control function is an example of distribution control information that is information in which the output distributed to the adjustment power supply in the period is reduced with respect to the reduction in the difference between the distributed output to the adjustment power supply and the output limit value of the adjustment power supply. The distribution control information may be a table representing the relationship between the distributed output and the distribution target output instead of the function, or may be a model (for example, a machine learning model such as a neural network) in which the distribution target output is obtained based on the distributed output.

The distribution determination unit 12 determines an output to the adjustment power supply based on the distributed output to the adjustment power supply and the output limit value of the adjustment power supply (the distributed output and the output limit value specified from the adjustment management DB 151), the supply-demand imbalance specified by the imbalance specifying unit 161, and the distribution control function determined by the function determination unit 11, and distributes the determined output. Regarding the adjustment power supply, a value indicating the distributed output is recorded in the output distribution DB 152.

Figure 4:
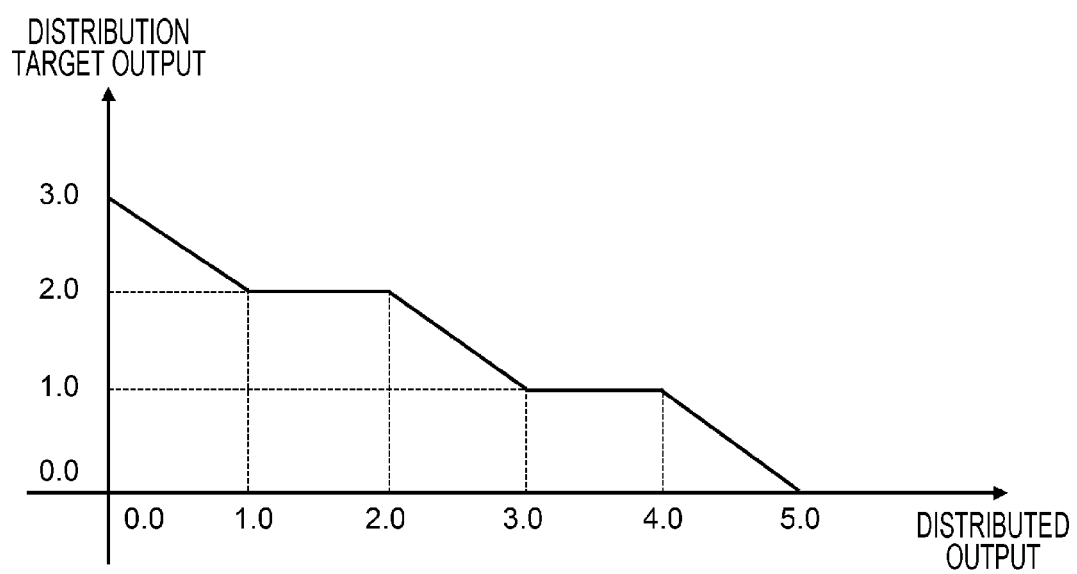
FIG. 4 is a diagram illustrating an example of a distribution control function according to the first embodiment.

FIG. 4 is a diagram illustrating an example of the distribution control function.

The distribution control function illustrated in FIG. 4 is a function of another example different from the distribution control function illustrated in FIG. 3. Specifically, according to the distribution control function illustrated in FIG. 3, the distribution target output is reduced linearly as the distributed output increases to the output upper limit value. According to the distribution control function illustrated in FIG. 4, when the increase in the distributed output is an increase within a certain range, the distributed output is not reduced and is constant. For example, the distribution control function is as follows.

When the distributed output is "0.0", the distribution target output (output distributable width per distribution period) is "3.0".

When the distributed output is equal to or more than "0.0" and less than "1.0", the distribution target output is linear and is "3.0" to "2.0".

When the distributed output is equal to or more than "1.0" and less than "2.0", the distribution target output is "2.0".

When the distributed output is equal to or more than "2.0" and less than "3.0", the distribution target output is linear and is "2.0" to "1.0".

When the distributed output is equal to or more than "3.0" and less than "4.0", the distribution target output is "1.0".

When the distributed output is equal to or more than "4.0" and less than "5.0", the distribution target output is linear and is "1.0" to "0.0".

In the distribution control function, the change amount of the distribution target output with respect to the increase amount of the distributed output (the reduction amount of the difference between the distributed output and the output limit value) may be determined based on at least one of the output change rate and the output limit value indicated by the adjustment management DB 151.

Note that the distribution control function may be automatically determined by the function determination unit 11, but may be manually determined instead of or in addition to this. For example, the function determination unit 11 may display the automatically determined distribution control function, receive manual correction of the distribution control function, and transfer the distribution control function after the manual correction to the distribution determination unit 12.

Figure 12:
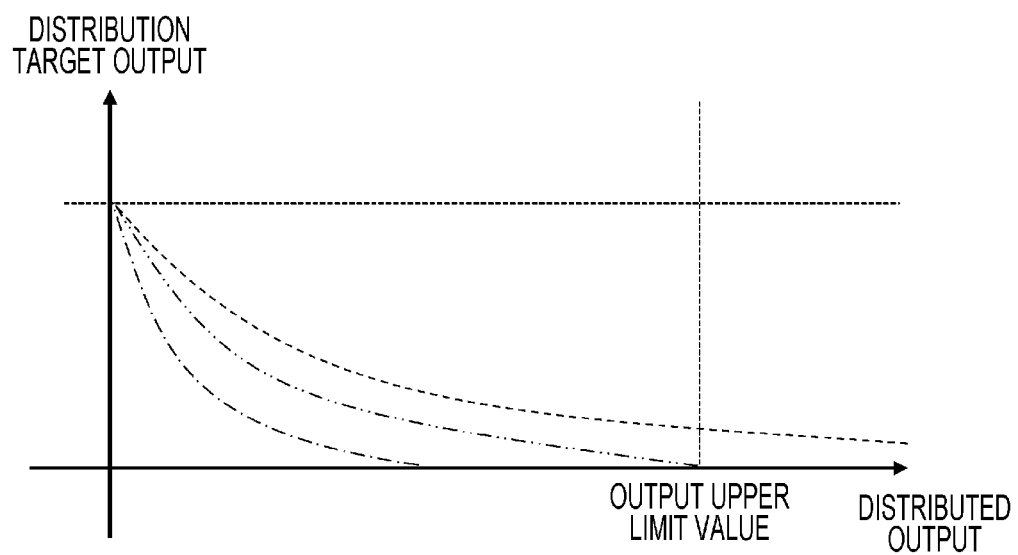
FIG. 12 is a diagram illustrating a modification example of the distribution control function according to the first embodiment.

Furthermore, as another example of the distribution control function, the distribution control function illustrated in FIG. 12 may be adopted. Any distribution control function is expressed by a curve (an example of a non-linear change). As a result, more appropriate output distribution is expected. For example, this is as follows.

According to the distribution control function expressed by the one-dot chain line, the distributed output does not substantially reach the output upper limit value.

According to the distribution control function expressed by the two-dot chain line, it is expected that the distribution target output until the distributed output reaches the output upper limit value is more appropriate than the linear function illustrated in FIG. 3.

According to the distribution control function expressed by the broken line, the distributed output relatively quickly reaches the output upper limit value, but the distribution target output is expected to be more appropriate than the linear function.

The distribution determination unit 12 receives an input of the supply-demand imbalance, the adjustment management DB 151, and the distribution control function, performs output distribution in accordance with the advantage order of the adjustment cost, and outputs an output distribution command value to each adjustment power supply.

By using the distribution control function as described above, it is possible to expect to more appropriate realize both the reduction of the adjustment cost and the maintenance of the output change rate. Note that the distribution control function illustrated in FIGS. 3 and 4 is an example of a function for an increasing command as described above. An example of the distribution control function for the decreasing command may be a function in which the decreasing-direction output of the distribution target to the adjustment power supply is reduced with respect to the reduction in the difference between the distributed decreasing-direction output to the adjustment power supply and the output lower limit value of the adjustment power supply (that is, the distributed decreasing-direction output increases in the decreasing direction).

Figure 5:
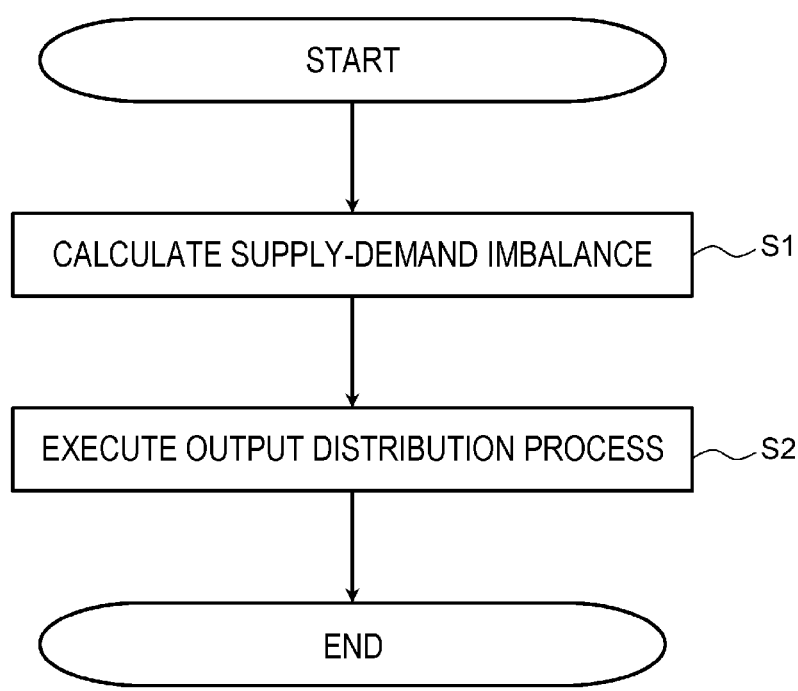
FIG. 5 is a flowchart illustrating processing of the power supply-demand adjustment device according to the first embodiment.

FIG. 5 is a flowchart illustrating processing of the power supply-demand adjustment device. This processing is typically performed periodically.

In S1, the imbalance specifying unit 161 calculates the supply-demand imbalance with respect to the corresponding adjustment power (for example, any one of the primary adjustment power, the secondary adjustment power (1), the secondary adjustment power (2), the tertiary adjustment power (1), and the tertiary adjustment power (2).

In S2, the output distribution unit 162 outputs the output distribution command value to each adjustment power supply in accordance with the advantage order so as to eliminate the supply-demand imbalance for the adjustment power. In a case where the output distribution of each adjustment power supply is determined in accordance with the advantage order, the output (at least a part of the adjustment power) is distributed in order from the adjustment power supply with low adjustment cost within a range of restriction that can be assigned to each adjustment power supply (that is, the range that is equal to or less than the output upper limit value), on the increasing side of the adjustment power. On the decreasing side of the adjustment power, the output is distributed in order from the adjustment power supply with high adjustment cost within the range of restriction that can be assigned to each adjustment power supply (that is, the range that is equal to or more than the output lower limit value).

FIG. 6 is a flowchart illustrating S2 (output distribution process) in FIG. 5. Note that FIG. 6 illustrates a basic example of output distribution in accordance with the advantage order, but the present invention may be applied to output distribution to which this basic example is applied in order to prevent the frequency fluctuation and reduce the adjustment cost. In the description of FIG. 6, one period is taken as an example ("target period" in the description of FIG. 6).

In S600, the output distribution unit 162 determines whether or not the supply-demand imbalance (=supply-demand) calculated in S1 of FIG. 5 has a positive value. When the supply-demand imbalance has a positive value, the determination result in S600 is true. When the supply-demand imbalance has a negative value, the determination result in S600 is false. Note that it is assumed that the supply-demand imbalance calculated in S1 exceeds a predetermined range (the absolute value of the supply-demand imbalance exceeds the upper limit or the lower limit of the predetermined range). In addition, the distribution control function may be determined, for example, at a predetermined timing after the start of S1. The distribution control function may be determined in each period or may be prepared in advance.

When the determination result of S600 is false (S600: NO), the increasing command is performed. That is, the output distribution unit 162 selects the adjustment power supply i having the smallest adjustment cost among the adjustment power supplies that have not been selected in the output distribution process for the target period, for example, based on the adjustment management DB 151. Then, in S611, the output distribution unit 162 determines an output to be distributed to the adjustment power supply i in the target period and transmits the increasing command (an output distribution command meaning to increase the output) of designating the value of the determined output to the adjustment power supply (for example, generator) i, based on the distributed output to the adjustment power supply i, and the distribution control function (for example, the distribution control function for the increasing command) based on the output upper limit value and the output change rate of the adjustment power supply i. In S612, the imbalance specifying unit 161 recalculates the supply-demand imbalance in consideration of the increasing command in S611 (assuming that the output determined in S611 is added to the distributed output to the adjustment power supply i). In S613, the output distribution unit 162 determines whether or not the supply-demand imbalance is eliminated (whether or not the supply-demand imbalance recalculated in S612 falls within a predetermined range (for example, 0)). When the determination result of S613 is true (S613: YES), the output distribution process for the target period is ended. When the determination result in S613 is false (S613: NO), in S614, the output distribution unit 162 selects the adjustment power supply (i+1) with the second smallest adjustment cost after the adjustment power supply i selected in the previous S611, among the adjustment power supplies that have not been selected in the output distribution process for the target period (as a result, i=i+1), and executes S611.

When the determination result in S600 is true (S600: YES), the decreasing command is performed. That is, the output distribution unit 162 selects the adjustment power supply j with the largest adjustment cost among the adjustment power supplies that have not been selected in the output distribution process for the target period, for example, based on the adjustment management DB 151. In S621, the output distribution unit 162 determines the output to be distributed to the adjustment power supply j in the target period based on the distributed output to the adjustment power supply j, the output upper limit value of the adjustment power supply j, and the distribution control function (for example, the distribution control function for the decreasing command) based on the output change rate of the adjustment power supply j, and transmits a decrease command (an output distribution command meaning to decrease the output) of designating the value of the determined output, to the adjustment power supply (for example, the generator) j. In S622, the imbalance specifying unit 161 recalculates the supply-demand imbalance in consideration of the amount of the decreasing command in S621 (assuming that the output determined in S621 is added to the distributed output to the adjustment power supply j). In S623, the output distribution unit 162 determines whether or not the supply-demand imbalance is eliminated (whether or not the supply-demand imbalance recalculated in S622 falls within the predetermined range (for example, 0)). When the determination result of S623 is true (S623: YES), the output distribution process for the target period is ended. When the determination result in S623 is false (S623: NO), in S624, the output distribution unit 162 selects the adjustment power supply (j+1) with the second largest adjustment cost after the adjustment power supply i selected in the previous S621, among the adjustment power supplies that have not been selected in the output distribution process for the target period (as a result, j=j+1), and executes S621.

According to the output distribution process illustrated in FIG. 6, for each period, the appropriate output in accordance with the difference between the output limit value of the adjustment power supply and the distributed output, and the adjustment cost of the adjustment original power is distributed in the ascending order of the adjustment cost (or in the descending order of the adjustment cost) until the supply-demand imbalance is eliminated. As a result, for each period, it is possible to suppress the number of adjustment power supplies as an output distribution destination while suppressing the frequency fluctuation due to the supply-demand imbalance, and to achieve both the reduction in the adjustment cost and the maintenance of the output change rate.

FIG. 7A is a diagram illustrating an example of output distribution according to a comparative example. FIG. 7B is a diagram illustrating an example of the output distribution according to the first embodiment.

For example, it is assumed that there are the adjustment power supplies A to C, and the output upper limit values of all of the adjustment power supplies A to C are "5.0", and area requirement (AR) is increased from "6.0" to "11.0", and therefore the supply-demand imbalance occurs, and it is necessary to distribute the adjustment power of the increase "5.0" in AR. It is assumed that the adjustment costs MA to MC of the adjustment power supplies A to C are MA<MB<MC. In addition, it is assumed that the output change rate of each of the adjustment power supplies A to C (the maximum value of the distribution target output (output distribution allowable width) with respect to the period T) is "3.0".

According to the comparative example, as illustrated in FIG. 7A, for the period T, "2.0" is allocated to the adjustment power supply A with the lowest adjustment cost, and "3.0" is allocated to the adjustment power supply B with the second lowest adjustment cost. As a result, it is conceivable that only the adjustment power supply C can increase the output after the period T, and thus the output change rate is low.

On the other hand, according to the first embodiment, as illustrated in FIG. 7B, "1.0" is allocated to the adjustment power supply A with the lowest adjustment cost in accordance with the distribution control function, and then, "2.0" is allocated to the adjustment power supply B with the second lowest adjustment cost, and finally, "2.0" is allocated to the adjustment power supply C with the third lowest adjustment cost. That is, the output is distributed in the order of the adjustment cost, and the distributed output is smaller as the difference between the distributed output and the output upper limit value becomes smaller. Therefore, the distributed output reaches the output upper limit value slowly in any of the adjustment power supplies A to C. Thus, the reduction in the number of adjustment power supplies capable of increasing the output is suppressed, so that it is possible to maintain the output change rate while reducing the adjustment cost.

Figure 8A:
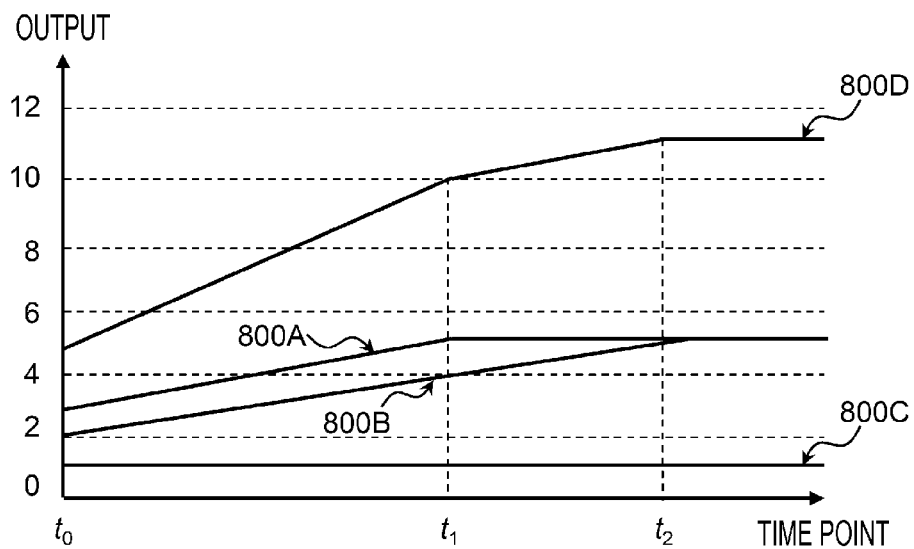
FIG. 8A is a diagram illustrating an example of an output change according to the comparative example.
Figure 8B:
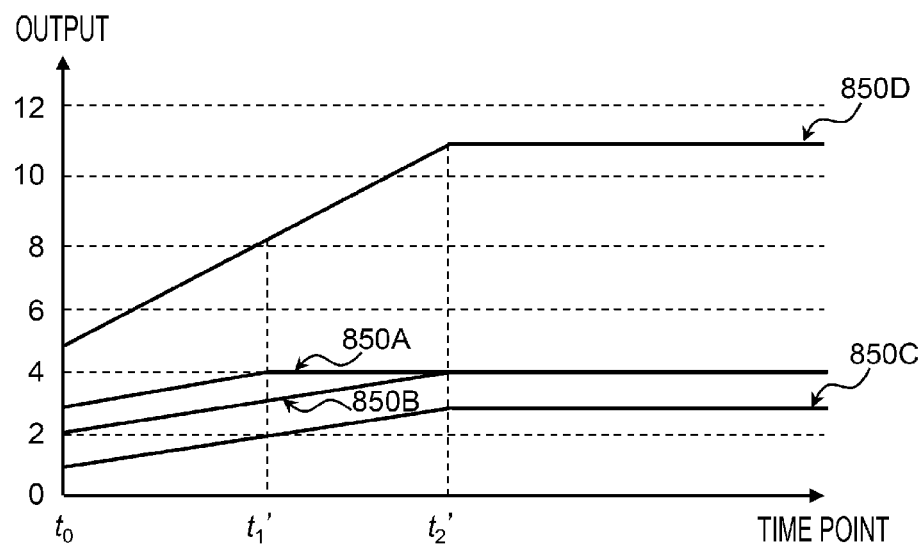
FIG. 8B is a diagram illustrating an example of an output change according to the first embodiment.

FIG. 8A is a diagram illustrating an example of the output change according to the comparative example. FIG. 8B is a diagram illustrating an example of the output change according to the first embodiment. FIG. 8A corresponds to FIG. 7A, and FIG. 8B corresponds to FIG. 7B.

According to the comparative example, as illustrated in FIG. 8A, the output is distributed to two adjustment power supplies A and B at a time point to. The output power of the adjustment power supply A reaches the target value "5.0" after the output distribution, at a time point t1 (see the reference sign 800A). The output power of the adjustment power supply B reaches the target value "5.0" after the output distribution, at a time point t2 (see the reference sign 800B). The output power of the adjustment power supply C is constant as "1.0" at least from the time point t0 to the time point t2 (see the reference sign 800C). Therefore, the total value of the output power of the adjustment power supplies A to C changes as indicated by the reference sign 800D, and then reaches "11.0" of the target (AR after the change) at the time point t2.

On the other hand, according to the first embodiment, as illustrated in FIG. 8B, the output is distributed to three adjustment power supplies A to C at the time point to. The output power of the adjustment power supply A reaches the target value "4.0" after the output distribution, at a time point t1' (see the reference sign 850A). The output power of the adjustment power supply B reaches the target value "4.0" after the output distribution, at a time point t2' (see the reference sign 850B). The output power of the adjustment power supply C reaches the target value "3.0" after the output distribution, at the same time point t2' (see the reference sign 850C). Therefore, the total value of the output power of the adjustment power supplies A to C changes as indicated by the reference sign 850D, and then reaches "11.0" of the target (AR after the change) at the time point t2'.

The time until the total value of the output power of the adjustment power supplies A to C reaches the target value "11.0" after the output distribution becomes shorter as the average of the output (distributable width) distributed to the one or more adjustment power supplies distributed in the corresponding period becomes smaller. As a result, the time from the time point t0 to the time point t2' becomes shorter than the time from the time point t0 to the time point t2.

Further, after the total value of the output power of the adjustment power supplies A to C reaches the target value "11.0" after the output distribution for the corresponding period, in the output distribution toward the next distribution period, only one adjustment power supply C is effective as a command destination in the comparative example (see FIG. 7A), whereas three adjustment power supplies A to C are effective as command destinations in the first embodiment (see FIG. 7B).

As described above, according to the first embodiment described above, the output distributable width on the increasing side is small when the distributed increasing-direction output of the adjustment power supply is near the output upper limit value, and the output distributable width on the decreasing side is small when the distributed decreasing-direction output of the adjustment power supply is near the output lower limit value. As a result, it is possible to achieve both the reduction of the adjustment cost and the maintenance of the output change rate by setting the frequency fluctuation due to the supply-demand imbalance within the allowable range.

Second Embodiment

A second embodiment will be described. At this time, differences from the first embodiment will be mainly described, and description of common points with the first embodiment will be omitted or simplified.

Figure 9:
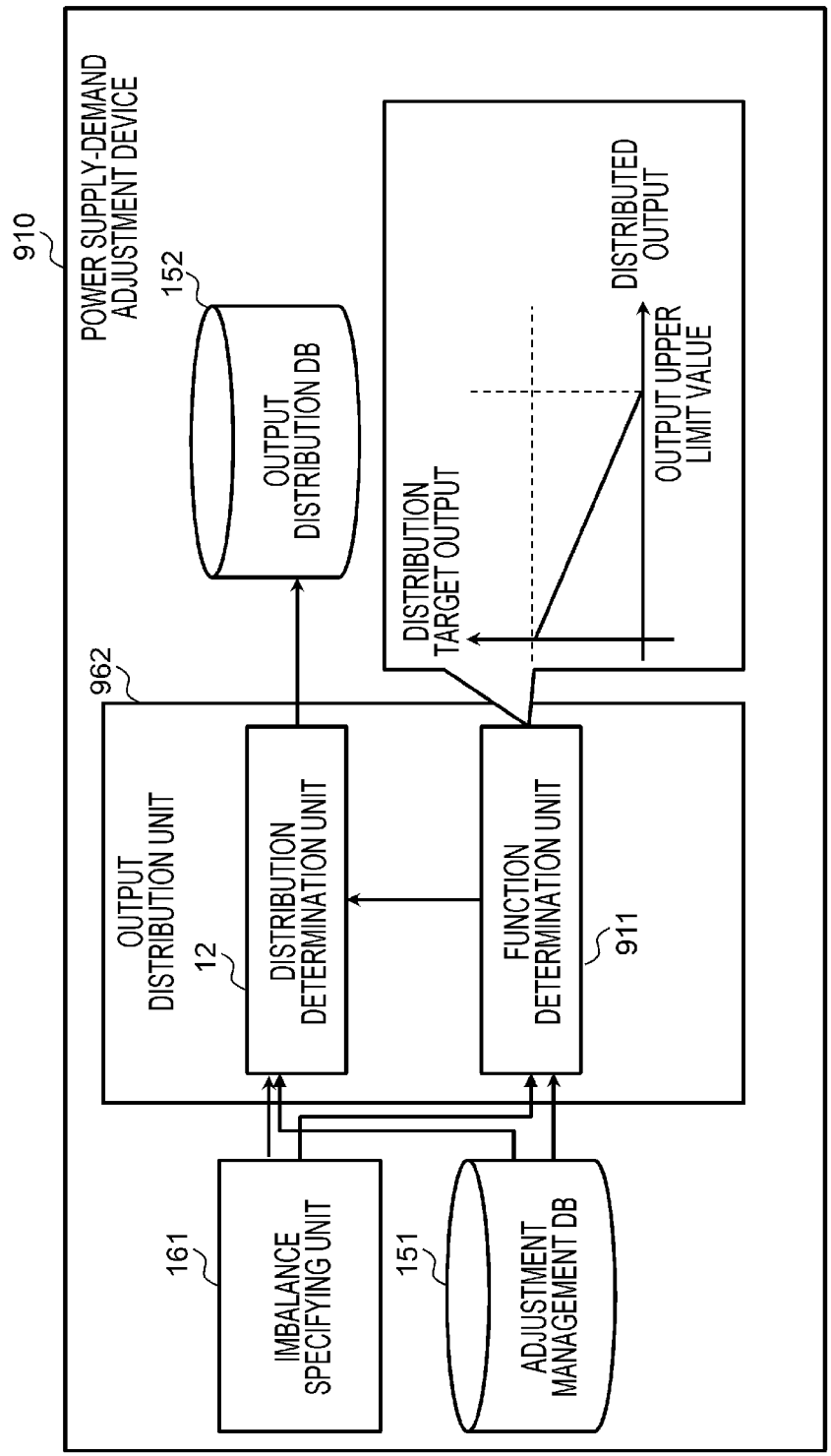
FIG. 9 is a block diagram illustrating a functional configuration of a power supply-demand adjustment device according to a second embodiment.

FIG. 9 is a block diagram illustrating a functional configuration of a power supply-demand adjustment device according to the second embodiment.

In FIG. 9, a power supply-demand adjustment device 910 includes an output distribution unit 962 instead of the output distribution unit 162. The output distribution unit 962 includes a function determination unit 911 instead of the function determination unit 11.

The function determination unit 911 determines the distribution control function based on the supply-demand imbalance specified by the imbalance specifying unit 161 in addition to the adjustment management DB 151.

Figure 10:
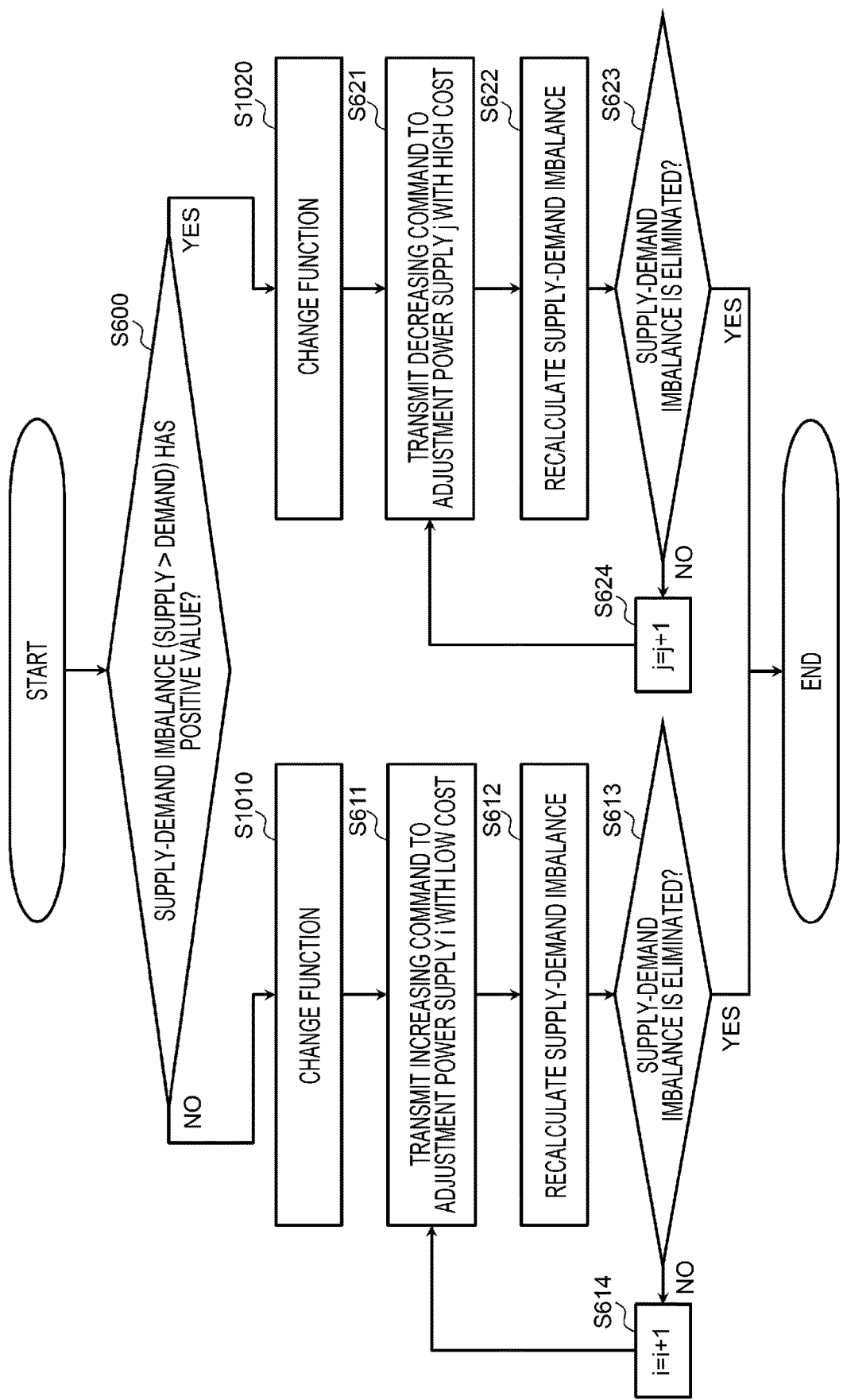
FIG. 10 is a flowchart illustrating an output distribution process according to the second embodiment.

FIG. 10 is a flowchart illustrating an output distribution process according to the second embodiment. The output distribution process illustrated in FIG. 10 is executed in S2 of FIG. 5 instead of the output distribution process illustrated in FIG. 6.

In the case of S600: NO, in S1010, the output distribution unit 962 changes the distribution control function based on the output upper limit value and the output change rate of the adjustment power supply i, based on the supply-demand imbalance calculated in S1 of FIG. 5. S611 is executed based on the changed distribution control function. In the present embodiment, the "change of the distribution control function" is performed, but this may be an example of determining the distribution control function based on the supply-demand imbalance calculated in S1 of FIG. 5 in addition to the output upper limit value and the output change rate of the adjustment power supply i.

In the case of S600: YES, in S1020, similar to S1010, the output distribution unit 962 changes the distribution control function based on the output upper limit value and the output change rate of the adjustment power supply j, based on the supply-demand imbalance calculated in S1 of FIG. 5. S621 is executed based on the changed distribution control function.

Figure 11A:
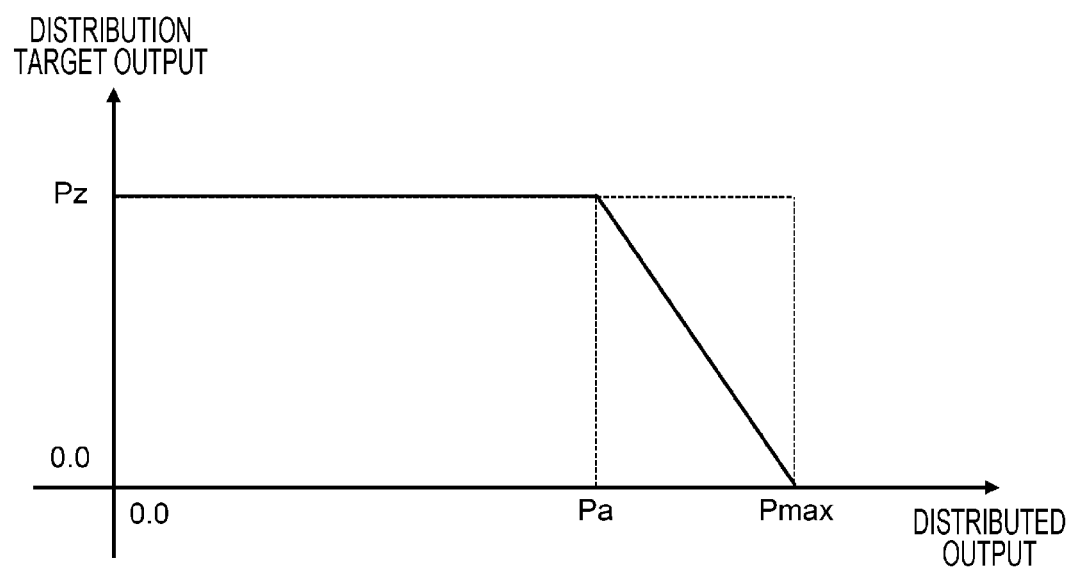
FIG. 11A is a diagram illustrating an example of a distribution control function before change.
Figure 11B:
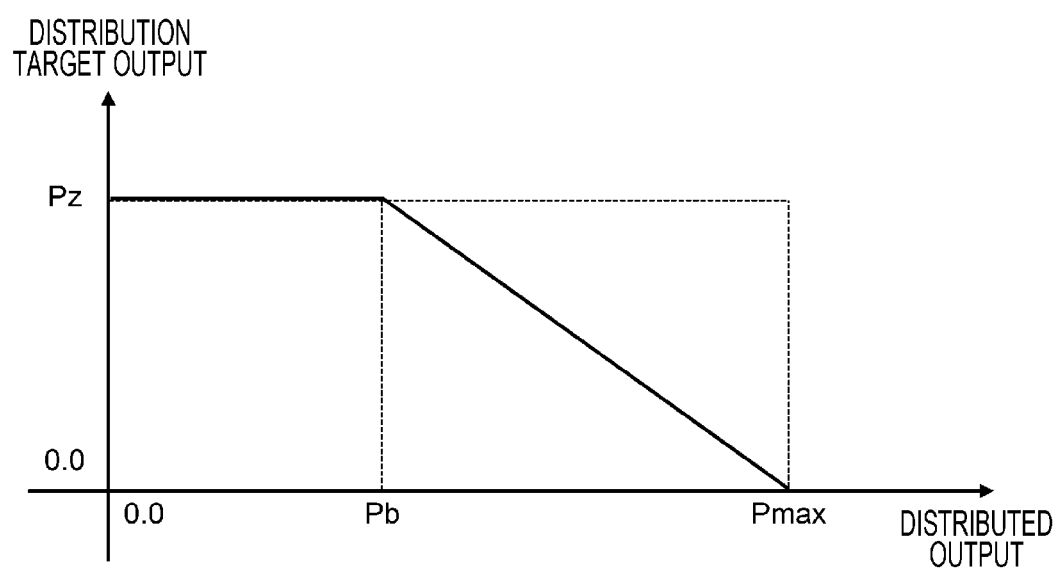
FIG. 11B is a diagram illustrating an example of the distribution control function after the change.

FIG. 11A is a diagram illustrating an example of the distribution control function before execution of S1010. FIG. 11B is a diagram illustrating an example of the distribution control function after the execution of S1010.

According to the distribution control function illustrated in FIG. 11A, when the distributed output is equal to or more than "0.0" and less than "Pa", the distribution target output (output distributable width) is "Pz", but the distribution target output is linear and is reduced from "Pz" to "0.0" as the distributed output is equal to or more than "Pa" and increases to "Pmax" (output upper limit value).

According to the distribution control function illustrated in FIG. 11B, when the distributed output is equal to or more than "0.0" and less than "Pb", the distribution target output is "Pz", but the distribution target output is linear and is reduced from "Pz" to "0.0" as the distributed output is equal to or more than "Pb" and increases to "Pmax". Since "Pb" is smaller than "Pa", it can be said that the function illustrated in FIG. 11B has a large effect of reducing the distribution target output on the increasing side when the distributed output of the adjustment power supply is near the output upper limit value as compared with the function illustrated in FIG. 11A. Therefore, the number of adjustment power supplies that can change the output only in one direction is reduced, and as a result, the overall output change rate (the maximum value of the output distributable width for a certain time) may increase, but the increase in the output of the adjustment power supply having small adjustment cost is limited, and the adjustment cost may increase.

Here, for example, which of the two functions illustrated in FIGS. 11A and 11B is used may be selected in accordance with the magnitude of the supply-demand imbalance calculated in S1. For example, when the supply-demand imbalance is smaller than a certain value, the function illustrated in FIG. 11A may be selected for the purpose of reducing the adjustment cost. When the supply-demand imbalance is equal to or more than a certain value, the function illustrated in FIG. 11B may be selected for the purpose of suppressing the supply-demand imbalance.

The supply-demand imbalance calculated in S1 is an example of the supply and demand state of the power system 20, which is specified by the power supply-demand adjustment device 910. In addition to the adjustment management DB 151, the distribution function control function is determined based on the supply and demand state of the power system 20. As a result, it is possible to determine which of the reduction of the adjustment cost and the maintenance of the output change rate is prioritized, in accordance with the supply and demand state of the power system 20. Note that the supply and demand state of the power system 20 may include at least one of supply-demand imbalance for the corresponding variation period level among different variation period levels, the total supply-demand imbalance of the power system 20, an operating status of each adjustment power supply (for example, whether or not it is operating, and output power), and a prediction value of future variation of at least one of supply and demand (for example, the prediction value of the output variation of the renewable energy).

As described above, according to the second embodiment described above, the distribution control function that decreases the output distributable width on the increasing side when the distributed output of the adjustment power supply is near the output upper limit value and decreases the output distributable width on the decreasing side when the distributed output of the adjustment power supply is near the output lower limit value is changed in accordance with the supply and demand state of the power system 20 (for example, supply-demand imbalance). As a result, it is possible to expect to more appropriately achieve both the reduction of the adjustment cost and the maintenance of the output change rate by setting the frequency fluctuation due to the supply-demand imbalance within the allowable range.

Third Embodiment

A third embodiment will be described. At this time, differences from the first and second embodiments will be mainly described, and description of common points with the first and second embodiments will be omitted or simplified.

Figure 13:
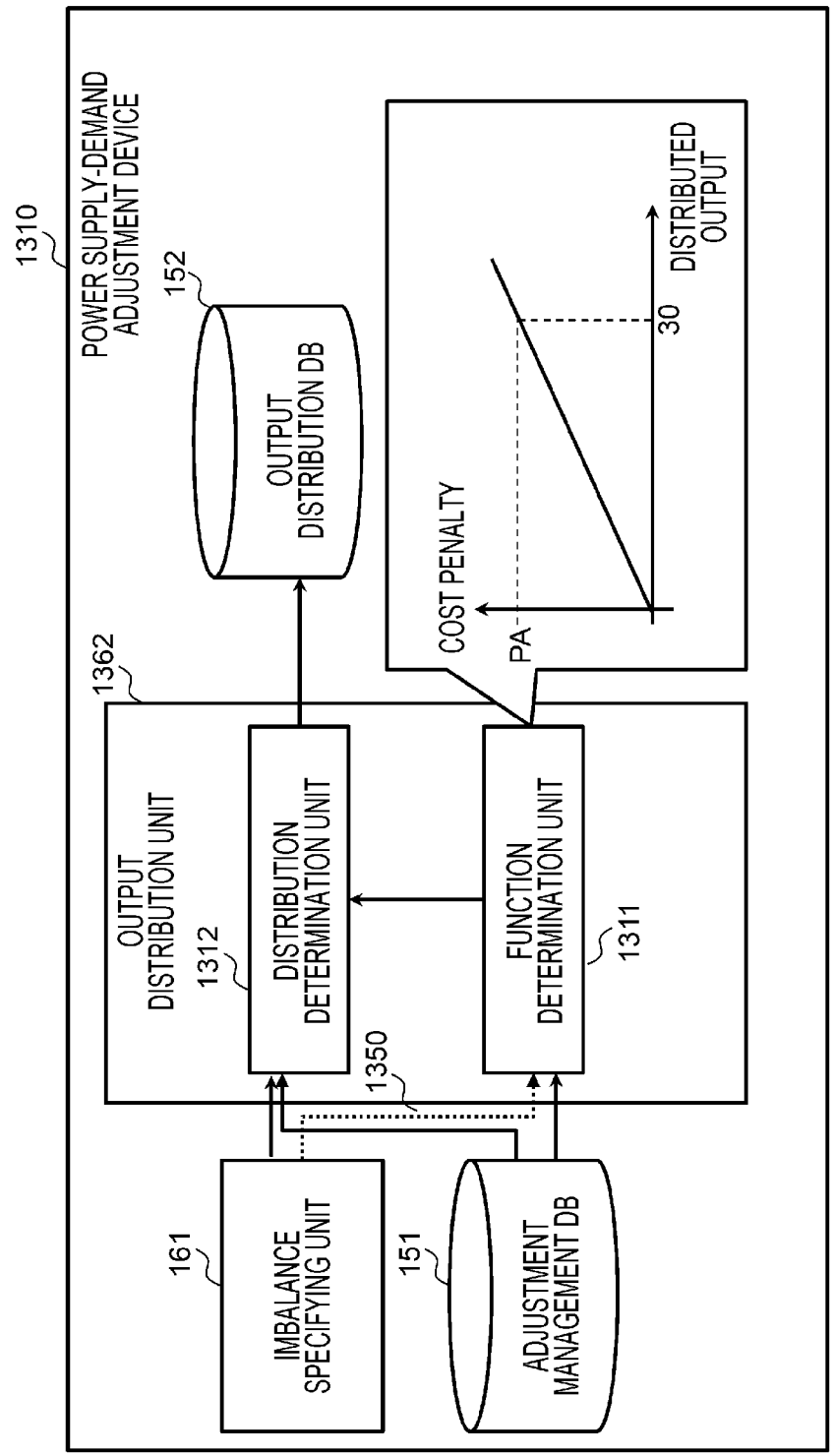
FIG. 13 is a block diagram illustrating a functional configuration of a power supply-demand adjustment device according to a third embodiment.

FIG. 13 is a block diagram illustrating a functional configuration of a power supply-demand adjustment device according to the third embodiment.

In FIG. 13, a power supply-demand adjustment device 1310 includes an output distribution unit 1362 instead of the output distribution unit 162 (or 962). The output distribution unit 1362 includes a function determination unit 1311 instead of the function determination unit 11 (or 911), and includes a distribution determination unit 1312 instead of the distribution determination unit 12.

The function determination unit 1311 determines a cost adjustment function based on the adjustment management DB 151. The cost adjustment function is a function set so that the cost penalty of the adjustment power supply increases with respect to the reduction (in other words, an increase in the distributed output) in the difference between the distributed output to the adjustment power supply and the output limit value of the adjustment power supply.

The distribution determination unit 1312 adjusts the adjustment cost of each adjustment power supply based on the cost penalty obtained from the cost adjustment function based on the distributed output to the adjustment power supply (the distributed output specified from the adjustment management DB 151), and performs output distribution in accordance with the advantage order of the adjusted adjustment cost.

The cost adjustment function is, for example, a function in which the distributed output is set to the first axis and the cost penalty is set to the second axis (axis perpendicular to the first axis). The cost adjustment function may be prepared for each adjustment power supply, or may be common to two or more adjustment power supplies. The cost adjustment function is an example of cost adjustment information that is information in which the cost penalty is increased with respect to the reduction in the difference between the distributed output to the adjustment power supply and the output limit value of the adjustment power supply. The cost adjustment information may be a table representing the relationship between the distributed output and the cost penalty instead of the function, or may be a model (for example, a machine learning model such as a neural network) in which the cost penalty is obtained based on the distributed output.

The cost adjustment function may be automatically determined by the function determination unit 1311, but may be manually determined instead of or in addition to this. For example, the function determination unit 1311 may display the automatically determined cost adjustment function, receive manual correction of the cost adjustment function, and transfer the cost adjustment function after the manual correction to the distribution determination unit 1312.

In addition, the cost adjustment function is not limited to a function in which the cost penalty changes linearly in accordance with a change in the distributed output. For example, the relationship between the distributed output and the cost penalty may be a non-linear relationship.

In addition, as indicated by a broken line arrow 1350 in FIG. 13, the function determination unit 1311 may determine the cost adjustment function based on the supply and demand state of the power system 20 in addition to the adjustment management DB 151. The supply and demand state of the power system 20 may include at least one of total supply-demand imbalance of the power system 20, supply-demand imbalance for a corresponding variation period level among different variation period levels, an operating status of each adjustment power supply, and a prediction value of future variation of at least one of supply and demand. As a result, it is expected to determine the cost adjustment function that contributes to more appropriately achieve both the reduction of the adjustment cost and the maintenance of the output change rate by setting the frequency fluctuation due to the supply-demand imbalance within the allowable range.

Further, the cost adjustment function illustrated in FIG. 13 is an example of the cost adjustment function for the increasing command. According to the cost adjustment function for the increasing command, the "added" cost penalty is set to increase as the absolute value of the distributed output in the increasing direction is larger. Therefore, for each adjustment power supply, when the output direction is the increasing direction, adjustment is performed to increase the adjustment cost of the adjustment power supply based on the cost penalty obtained from the cost adjustment function for the increasing command based on the distributed increasing-direction output to the adjustment power supply (for example, the cost penalty is added to the adjustment cost). On the other hand, the cost adjustment function for the decreasing command is a function set such that the cost penalty of "subtracting" increases as the absolute value of the distributed output in the decreasing direction increases. In the decreasing direction, decreasing output distribution is performed from the high-cost adjustment power supply. Therefore, as the absolute value of the distributed output in the decreasing direction increases, the adjustment power supply originally having high cost becomes not high cost (the cost penalty of "subtracting" increases), and the adjustment power supply having a low cost without a penalty can be preferentially decreased. That is, for each adjustment power supply, when the output direction is the decreasing direction, adjustment is performed to reduce the adjustment cost of the adjustment power supply based on the cost penalty obtained from the cost adjustment function for the decreasing command based on the distributed decreasing-direction output to the adjustment power supply (for example, the cost penalty is subtracted from the adjustment cost). Note that the "cost penalty" may be set by the system operator in order to determine the order of the output distribution.

Figure 14:
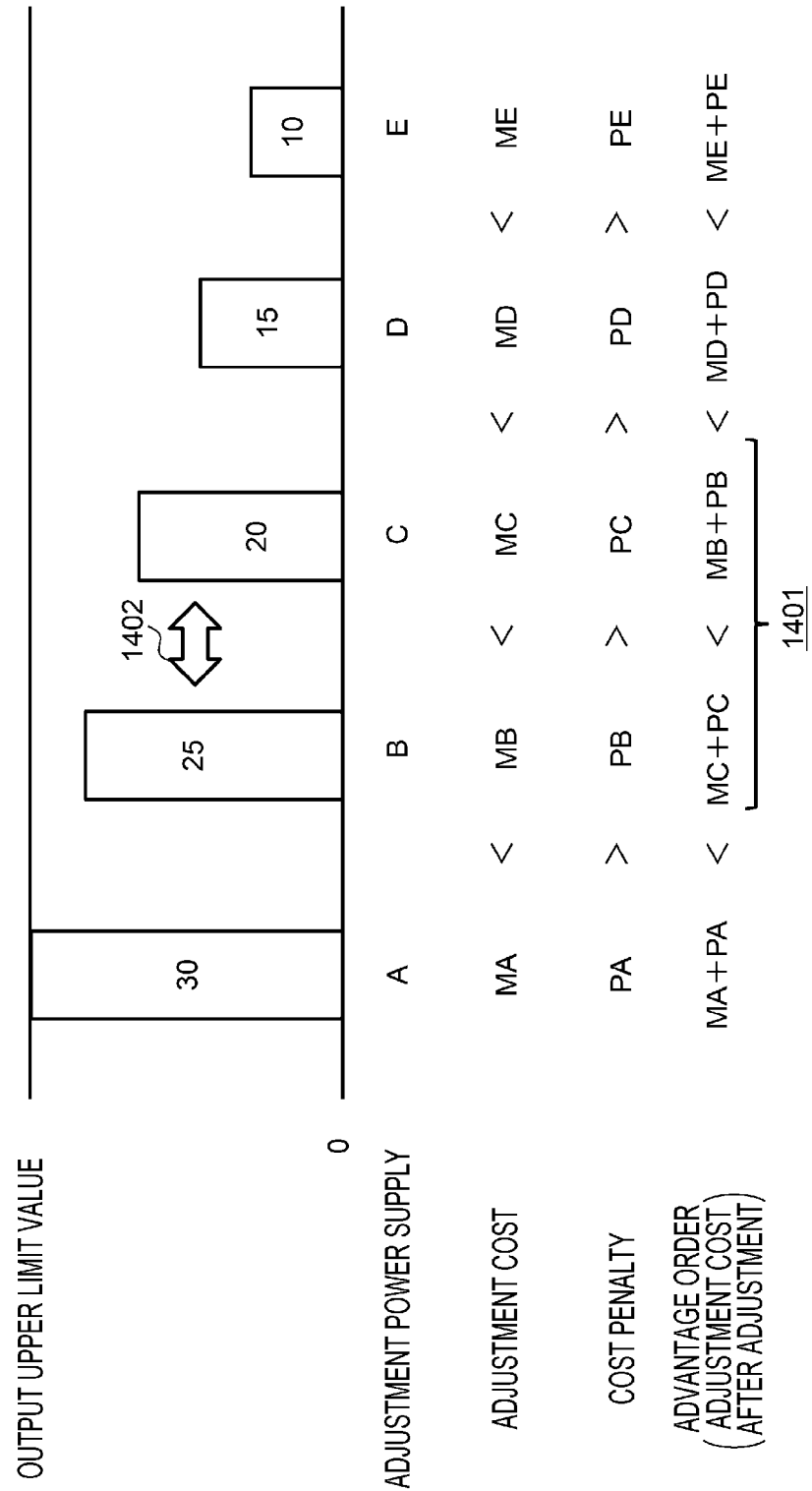
FIG. 14 is a diagram illustrating an example of an advantage order according to the third embodiment.

FIG. 14 is a diagram illustrating an example of an advantage order according to the third embodiment.

It is assumed that there are the adjustment power supplies A to E. It is assumed that the output upper limit values of the adjustment power supplies A to E are all "30". For the period X, the relationship between the adjustment costs MA to ME of the adjustment power supplies A to E is MA<MB<MC<MD<ME (MA is the smallest). For the period X, the distributed outputs of the adjustment power supplies A to E are "30", "25", "20", "15", and 10. That is, it is assumed that the distributed output of the adjustment power supply A having the smallest adjustment cost is the largest and the distributed output of the adjustment power supply E having the largest adjustment cost is the smallest.

For the period X, the distribution determination unit 1312 specifies the cost penalties PA to PE of the adjustment power supplies A to E based on the distributed outputs of the adjustment power supplies A to E illustrated in FIG. 14, by using the cost adjustment function (function determined by the function determination unit 1311) illustrated in FIG. 13. The relationship between the cost penalties PA to PE is PA>PB>PC>PD>PE (PA is the largest).

The distribution determination unit 1312 adjusts the adjustment costs MA to ME of the adjustment power supplies A to E based on the specified cost penalties PA to PE. Specifically, for example, the adjustment costs of the adjustment power supplies A to E are MA+PA, MB+PB, MC+PC, MD+PD, and ME+PE. That is, the adjustment cost after the adjustment of the adjustment power supplies A to E is MA+PA, MB+PB, MC+PC, MD+PD, and ME+PE. The order of adjustment costs after adjustment is the advantage order.

According to the order of the adjustment costs after the adjustment (the order illustrated in FIG. 14), as indicated by the reference sign 1401, MC+PC is larger than MB+PB. Thus, for the period X, the order of the adjustment power supply B and the adjustment power supply C is switched as indicated by the reference sign 1402. Therefore, for the period X, in the output distribution in accordance with the advantage order, the output is distributed to the adjustment power supply C earlier than the adjustment power supply B.

As described above, according to the third embodiment described above, the cost adjustment function in which the adjustment cost after the adjustment is increased when the distributed increasing-direction output of the adjustment power supply is near the output upper limit value, and the adjustment cost after the adjustment is decreased when the distributed decreasing-direction output of the adjustment power supply is near the output lower limit value is determined, the adjustment cost is adjusted based on the cost adjustment function, and the output distribution in accordance with the advantage order in which the increasing-direction output is distributed in ascending order of the adjustment cost after the adjustment (or the decreasing-direction output is distributed in descending order of the adjustment cost after the adjustment). As a result, for the adjustment power supply in which the distributed increasing-direction output is near the output upper limit value, the adjustment cost after the adjustment increases (alternatively, the adjustment cost after the adjustment decreases for the adjustment power supply in which the distributed decreasing-direction output is close to the output lower limit value). Thus, the possibility that the output is distributed later increases. Therefore, the reduction in the number of adjustment power supplies capable of increasing (or decreasing) the output is suppressed. As a result, it is possible to achieve both the reduction of the adjustment cost and the maintenance of the output change rate by setting the frequency fluctuation due to the supply-demand imbalance within the allowable range.

Note that, in the third embodiment, the distribution control function in the first and second embodiments may or may not be used. In a case where the distribution control function is used, for example, the function determination unit 1311 may transfer the distribution control function to the distribution determination unit 1312 in addition to the cost adjustment function. The distribution determination unit 1312 may adjust the adjustment cost of each adjustment power supply based on the cost adjustment function, and determine the distribution target increasing-direction output to the adjustment power supply based on the distribution control function and the distributed increasing-direction output of the adjustment power supply in the ascending order of the adjustment cost after the adjustment, or determine the distribution target decreasing-direction output to the adjustment power supply based on the distribution control function and the distributed decreasing-direction output of the adjustment power supply in the descending order of the adjustment cost after the adjustment.

The present invention is not limited to the above-described embodiment, and various modification examples may be provided. For example, the above-described embodiment is described in detail in order to explain the present invention in an easy-to-understand manner, and the above embodiment is not necessarily limited to a case including all the described configurations. Further, some components in one embodiment can be replaced with the components in another embodiment, and the configuration of another embodiment can be added to the configuration of one embodiment. Regarding some components in the embodiments, other components can be added, deleted, and replaced.

REFERENCE SIGNS LIST

151 adjustment management DB
152 output distribution DB
20 power system
10 power supply-demand adjustment device
161 imbalance specifying unit
162 output distribution unit

The invention claimed is:

1. A power supply-demand adjustment device that performs output distribution by distributing at least a part of procured adjustment power to an adjustment power supply in a power system, the power supply-demand adjustment device comprising:
   a processor and a memory storing instructions that, when executed by the processor, cause the processor to:
   determine a supply-demand imbalance of the power system including N adjustment power supplies (N is a natural number of 2 or more); and
   perform output distribution to M adjustment power supplies (M is a natural number of N or less) among the N adjustment power supplies in accordance with an advantage order of adjustment cost, based on adjustment management information and the determined supply-demand imbalance for each of the N adjustment power supplies, the adjustment management information including an output change rate, a distributed output, and an output limit value,
   wherein the output distribution in accordance with the advantage order for each period comprises:
   (x) distributing an output to each of the M adjustment power supplies in an increasing direction in ascending order of the adjustment cost, or distributing the output to each of the M adjustment power supplies in a decreasing direction in descending order of the adjustment cost; and
   (y) determining a distribution control function for each of the adjustment power supplies in which a first axis represents the distributed output and a second axis represents a distribution target output, wherein the distribution target output is an output distributed in the period, the function being configured such that, regardless of whether the output direction is the increasing direction or the decreasing direction, the distribution target output is reduced in response to a reduction in a difference between the distributed output and the output limit value of the adjustment power supply.

2. The power supply-demand adjustment device according to claim 1, wherein for each period, depending on whether the output direction is the increasing direction or the decreasing direction, the processor is further configured to:
   determine distribution control information based on the adjustment management information, the distribution control information indicating that the output distributed to the adjustment power supply in the period is reduced with respect to the reduction in the difference between the distributed output to the adjustment power supply and the output limit value of the adjustment power supply, and
   determine the output to the adjustment power supply and distributes the output determined, based on the distributed output to the adjustment power supply, the output limit value of the adjustment power supply, and the distribution control information determined.

3. The power supply-demand adjustment device according to claim 2, wherein the distribution control information is determined based on a supply and demand state of the power system in addition to the adjustment management information.

4. The power supply-demand adjustment device according to claim 3, wherein the supply and demand state of the power system includes at least one of total supply-demand imbalance of the power system, supply-demand imbalance for a corresponding variation period level among different variation period levels, an operating status of each adjustment power supply, and a prediction value of future variation of at least one of supply and demand.

5. The power supply-demand adjustment device according to claim 1, wherein for each period, depending on whether the output direction is the increasing direction or the decreasing direction, the processor is further configured to:
   determines cost adjustment information based on the adjustment management information, the cost adjustment information indicating that a cost penalty of the adjustment power supply is increased with respect to the reduction in the difference between the distributed output to the adjustment power supply and the output limit value of the adjustment power supply,
   for each adjustment power supply, performs adjustment of increasing the adjustment cost of the adjustment power supply based on the cost penalty obtained from the cost adjustment information based on a distributed increasing-direction output to the adjustment power supply when the output direction is the increasing direction, and performs adjustment of decreasing the adjustment cost of the adjustment power supply based on the cost penalty obtained from the cost adjustment information based on a distributed decreasing-direction output to the adjustment power supply when the output direction is the decreasing direction, and
   performs the output distribution in accordance with the advantage order of the adjustment cost after the adjustment.

6. The power supply-demand adjustment device according to claim 5, wherein the cost adjustment information is determined based on a supply and demand state of the power system in addition to the adjustment management information.

7. The power supply-demand adjustment device according to claim 6, wherein the supply and demand state of the power system includes at least one of total supply-demand imbalance of the power system, supply-demand imbalance for a corresponding variation period level among different variation period levels, an operating status of each adjustment power supply, and a prediction value of future variation of at least one of supply and demand.

8. The power supply-demand adjustment device according to claim 1, wherein in the output distribution of each period, the processor is configured to:
   (A) determines whether the supply-demand imbalance that exceeds a predetermined range has a positive value in which a supply exceeds a demand, or a negative value in which the supply falls below the demand,
   (B) performs the following (b1) and (b2) after the determination of (A),
   (b1) distribution of the output to an adjustment power supply having the lowest adjustment cost among adjustment power supplies to which the output is not distributed in the period, based on the adjustment management information when the supply-demand imbalance has the negative value in the determination of (A), and distribution of the output to an adjustment power supply having the highest adjustment cost among the adjustment power supplies to which the output is not distributed in the period, based on the adjustment management information when the supply-demand imbalance has the positive value in the determination of (A), and
   (b2) determination of whether or not the supply-demand imbalance falls within a predetermined range, after (b1),
   (C) performs (b1) when a determination result of (b2) is false, and
   (D) ends the output distribution in accordance with the advantage order in the period when the determination result of (b2) is true.

9. A power supply-demand adjustment method in which a computer system performs output distribution by distributing at least a part of procured adjustment power to an adjustment power supply in a power system, the power supply-demand adjustment method comprising:
   specifying a supply-demand imbalance of a power system including N adjustment power supplies (N is a natural number of 2 or more); and
   performing output distribution to M adjustment power supplies (M is a natural number of N or less) among the N adjustment power supplies in accordance with an advantage order of adjustment cost, based on adjustment management information and the supply-demand imbalance specified for each of the N adjustment power supplies, the adjustment management information including an output change rate, a distributed output, and an output limit value,
   wherein the output distribution in accordance with the advantage order for each period comprises:
   (x) distributing an output to each of the M adjustment power supplies in an increasing direction in ascending order of the adjustment cost, or distributing the output to each of the M adjustment power supplies in a decreasing direction in descending order of the adjustment cost; and (y) determining a distribution control function for each of the adjustment power supplies in which a first axis represents the distributed output and a second axis represents a distribution target output, wherein the distribution target output is an output distributed in the period, the function being configured such that, regardless of whether the output direction is the increasing direction or the decreasing direction, the distribution target output is reduced in response to a reduction in a difference between the distributed output and the output limit value of the adjustment power supply.

\* \* \* \* \*